United States Patent
Nishi

[11] Patent Number: 5,870,809
[45] Date of Patent: Feb. 16, 1999

[54] FRAME STRUCTURE FOR BUGGY, METHOD OF MANUFACTURING FRAME STRUCTURE, AND JIG FOR USE IN MANUFACTURING FRAME STRUCTURE

[75] Inventor: Yasuhiro Nishi, Kumamoto, Japan

[73] Assignee: Honda Giken Kogyo Kabushiki Kaisha, Tokyo, Japan

[21] Appl. No.: 103,310

[22] Filed: Jun. 23, 1998

Related U.S. Application Data

[62] Division of Ser. No. 790,901, Jan. 29, 1997.

[30] Foreign Application Priority Data

May 10, 1996 [JP] Japan ................................... 8-115167

[51] Int. Cl.$^6$ ...................................................... B25B 27/14
[52] U.S. Cl. ......................................... 29/281.5; 29/281.3
[58] Field of Search .................................. 29/281.5, 238, 29/247, 281.3; 269/27, 297, 291, 303

[56] References Cited

U.S. PATENT DOCUMENTS

| | | | |
|---|---|---|---|
| 4,574,902 | 3/1986 | Irimajiri . | |
| 4,735,275 | 4/1988 | Tsukahara et al. | 180/215 |
| 5,060,748 | 10/1991 | Iwai et al. | 180/215 |
| 5,064,016 | 11/1991 | Iwai et al. | 180/215 |
| 5,083,632 | 1/1992 | Saito et al. | 180/215 |
| 5,107,952 | 4/1992 | Matsubayashi et al. | 180/349 |
| 5,330,028 | 7/1994 | Handa et al. | 180/219 |
| 5,699,872 | 12/1997 | Miyakawa et al. . | |

FOREIGN PATENT DOCUMENTS

| | | |
|---|---|---|
| 1-204880 | 8/1989 | Japan . |
| 6-92237 | 11/1994 | Japan . |
| 7-88127 | 9/1995 | Japan . |

*Primary Examiner*—David A. Scharbel
*Assistant Examiner*—Lee Wilson
*Attorney, Agent, or Firm*—Merchant, Gould, Smith, Edell, Welter & Schmidt, P.A.

[57] ABSTRACT

A pair of front and rear arm brackets for supporting swing arms extends between and is integrally joined to a pair of laterally spaced lower frames, and a steering bracket for supporting a steering shaft is disposed between the front and rear arm brackets and between the lower frames, and is integrally joined to the front and rear arm brackets and the lower frames. The front and rear arm brackets and the steering bracket are assembled and welded together into a lower component before being joined to the lower frames. The lower component is positioned on a positioning table, and then positioned with respect to the lower frames by a setting jig for high positional accuracy. The setting jig has lateral cylinder units for laterally gripping the arm brackets and front and rear cylinder units having positioning pins for being inserted into attachment holes defined in the arm brackets to position the arm brackets. The setting jig also has a vertical cylinder unit having a piston rod which can be inserted into a holder hole defined in the steering bracket. The piston rod has projecting plungers which engage and press the lower component against the lower frames when the piston rod is retracted. With the lower component thus pressed against the lower frames, contacting portions thereof are welded to each other for keeping the attachment holes and the holder holes at a desired level of positional accuracy.

2 Claims, 6 Drawing Sheets

FRAME STRUCTURE FOR BUGGY, METHOD OF MANUFACTURING FRAME STRUCTURE, AND JIG FOR USE IN MANUFACTURING FRAME STRUCTURE

This application is a Divisional of application Ser. No. 08/790,901, filed Jan. 29, 1997, which application(s) are incorporated herein by reference.

BACKGROUND OF THE INVENTION

1. Field of the Invention

The present invention relates to a frame structure for a buggy such as a four-wheeled buggy for use on rough terrain, a method of manufacturing such a frame structure, and a jig for use in manufacturing such a frame structure.

2. Description of the Related Art

Suspension structures for use with a frame structure which supports front wheels of a four-wheeled buggy with a rider's saddle are known from Japanese patent publications Nos. 6-92237 and 7-88127, for example. The disclosed frame structure includes a pair of laterally spaced lower frames extending longitudinally of the frame structure and a pair of arm brackets mounted on the lower frames. Swing arms are attached to the arm brackets, and a steering bracket is joined to the lower frames. The steering bracket has a holder hole through which a support member is installed. The lower end of a steering shaft is rotatably supported by the support member.

Loads are concentrated on the arm brackets which support the swing arm. However, since the arms brackets are of a relatively small size and only locally project from the lower frames, the arm brackets are reinforced by various stiffening members for maintaining a desired level of supporting rigidity.

Generally, the arm brackets are welded to the lower frames, and the steering bracket is also welded to the lower frames. When one of these brackets is welded, the other brackets that have already been welded are subject to the influence of thermal strain which tends to lower the dimensional accuracy of the other brackets. Therefore, it is necessary to remove such strain that has been introduced by the welding process.

There has been a demand for a frame structure which is capable of distributing loads which would otherwise be concentrated on an arm bracket and for a method of manufacturing such a frame structure through a simplified welding process which does not incur thermal strain with respect to welded regions and can join members with high positional accuracy.

SUMMARY OF THE INVENTION

It is an object of the present invention to provide a frame structure for use in a buggy, for example, which is capable of distributing loads concentrated on arm brackets that support swing arms.

Another object of the present invention is to provide a method of manufacturing such a frame structure through a simplified welding process which can join members with high positional accuracy.

Still another object of the present invention is to provide a jig for use in manufacturing such a frame structure.

According to the present invention, there is provided a frame structure for a buggy, comprising a pair of laterally spaced, longitudinally extending lower frames, a pair of front and rear arm brackets for supporting swing arms, the front and rear arm brackets extending between and integrally joined to the lower frames, and a steering bracket for supporting a steering shaft, the steering bracket being disposed between the front and rear arm brackets and between the lower frames, and integrally joined to the front and rear arm brackets and the lower frames.

As described above, the arm brackets which extend between the lower frames transversely of the frame structure are integrally joined to the lower frames, and the steering bracket is integrally joined to the front and rear arm brackets and the lower frames. Therefore, loads applied to the arm brackets are distributed widely to other brackets and a main frame, so that support rigidity of the arm brackets may be effectively enhanced.

The front and rear arm brackets and the steering bracket are assembled and joined to each other before being joined to the lower frames.

Since the front and rear arm brackets and the steering bracket are assembled beforehand, the positional accuracy of the arm brackets and the steering bracket can easily be maintained, and any subsequent process of achieving a desired level of positional accuracy of the arm brackets and the steering bracket will not be required.

According to the present invention, there is also provided a method of manufacturing a frame structure for a buggy, comprising the steps of joining a pair of front and rear arm brackets and a steering bracket to each other, positioning a holder hole defined in the steering bracket while pressing the front and rear arm brackets and the steering bracket against a pair of lower frames, inserting positioning pins into attachment holes defined in the front and rear arm brackets thereby to position the front and rear arm brackets, and thereafter, welding contacting regions of the front and rear arm brackets and the lower frames and contacting regions of the steering bracket and the lower frames.

As described above, while positioning the holder hole of the steering bracket, the front and rear arm brackets and the steering bracket previously joined to each other are pressed against the lower frames, and the positioning pins are inserted into the attachment holes of the front and rear arm brackets thereby to position the front and rear arm brackets. Therefore, the positional accuracy of the holder hole can be increased, and the positional accuracy of the attachment holes can also be increased, resulting in an increase in accuracy with which a steering shaft and swing arms may be mounted on the steering bracket and the front and rear arm brackets, respectively.

According to the present invention, there is further provided a jig for use in joining a lower component to a pair of laterally spaced lower frames, the lower component comprising a pair of front and rear arm brackets for supporting swing arms and a steering bracket for supporting a steering shaft, the front and rear arm brackets and the steering bracket being joined to each other, the jig comprising arm bracket positioning means for positioning attachment holes defined in the front and rear arm brackets in a swing arm attachment position, and steering bracket positioning means for positioning a holder hole defined in the steering bracket in a steering shaft support position while pressing the lower component against the lower frames.

The attachment holes of the arm brackets are positioned by the arm bracket positioning means, whereas the holder hole of the steering bracket is positioned by the steering bracket positioning means. Thereafter, contacting regions of the lower component and the lower frames are joined to each other as by welding. Since the lower component is set in its predetermined position by positioning the attachment holes and the holder hole in place, the lower component and the lower frames may be welded to each other with high positional accuracy.

The arm bracket positioning means comprises a plurality of front, rear, and lateral cylinder units for horizontally gripping the lower component to position the lower component laterally, the front and rear cylinder units having respective piston rods, and a plurality of positioning pins mounted on respective distal ends of the piston rods for engaging in and positioning the attachment holes, and the steering bracket positioning means comprises a vertical cylinder unit having a piston rod for being inserted in the holder hole and pressing the lower component against the lower frames thereby vertically positioning the lower component.

When the steering bracket is positioned by inserting the piston rod of the vertical cylinder unit into the holder hole of the steering bracket, the vertical cylinder unit is operated to press the lower component against the lower frames.

At the same time, the arm brackets are positioned by the front, rear, and lateral cylinder units, and the positioning pins of the front and rear cylinder units are inserted into the attachment holes of the arm brackets to position the attachment holes.

When the steering bracket and the arm brackets are thus positioned, they are welded to the lower frames. Inasmuch as the attachment holes and the holder hole are firmly positioned during the welding process, a steering shaft and swing arms will be assembled highly accurately on the frame structure without incurring the influence of thermal strain.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

A frame structure according to the present invention is particularly suitable when used in a four-wheeled buggy having a steering handlebar and a steering shaft, which are of a design usually found on a motorcycle, and a suspension mechanism which is of a type usually found on a four-wheeled motor vehicle. The four-wheeled buggy is typically used as a recreational vehicle on rough terrain.

Figure 1:
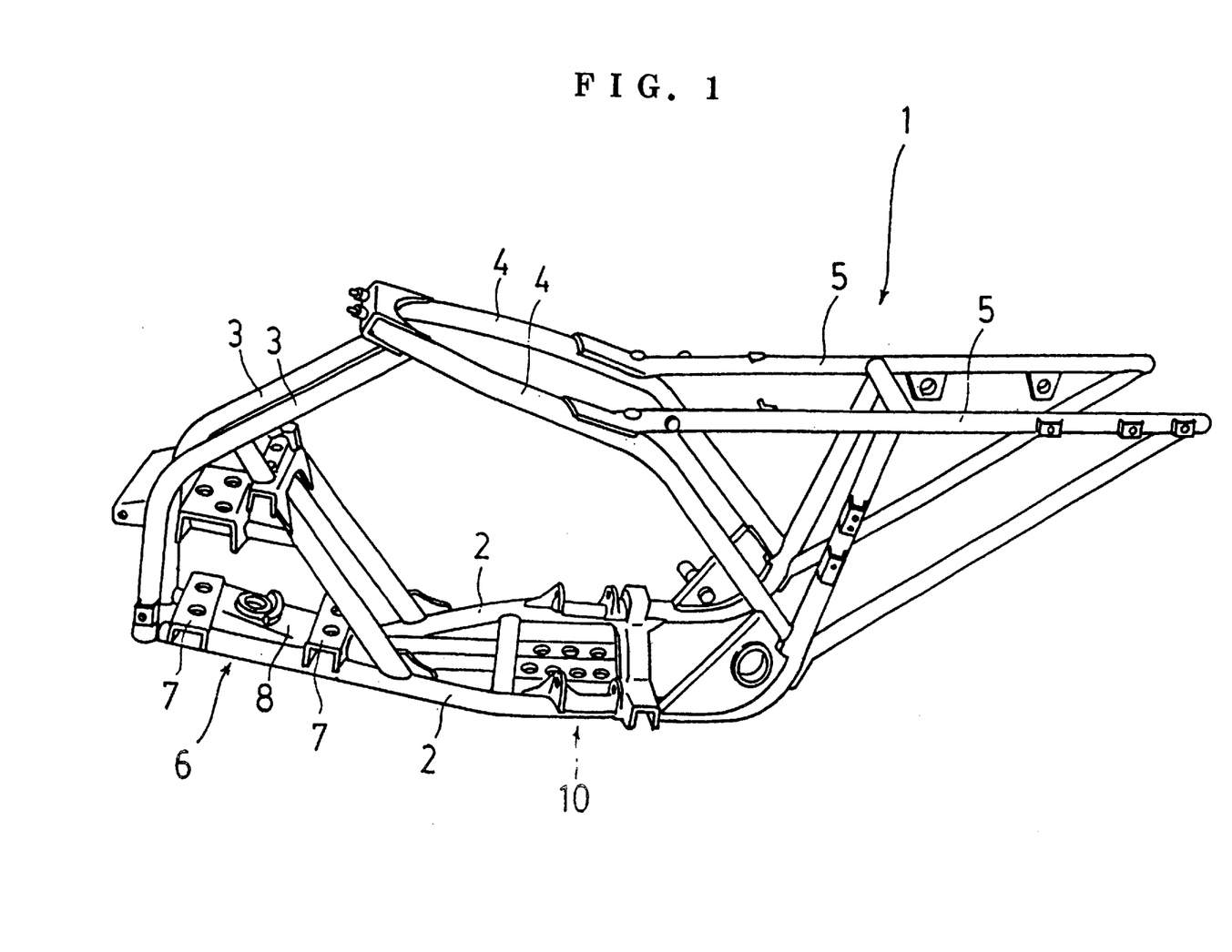
FIG. 1 is a perspective view of a frame structure for a buggy according to the present invention.

As shown in FIG. 1, a frame structure 1 according to an embodiment of the present invention comprises a pair of laterally spaced tubular lower frames 2 extending longitudinally of the frame structure 1, a pair of laterally spaced tubular front frames 3 extending upwardly from respective front ends of the lower frames 2 and then obliquely rearwardly, and a pair of laterally spaced tubular upper frames 4 extending obliquely downwardly from respective upper ends of the front frames 3. The frame structure 1 also has a pair of laterally spaced tubular seat frames 5 extending substantially horizontally rearwardly from respective intermediate portions of the upper frames 4.

Figure 2:
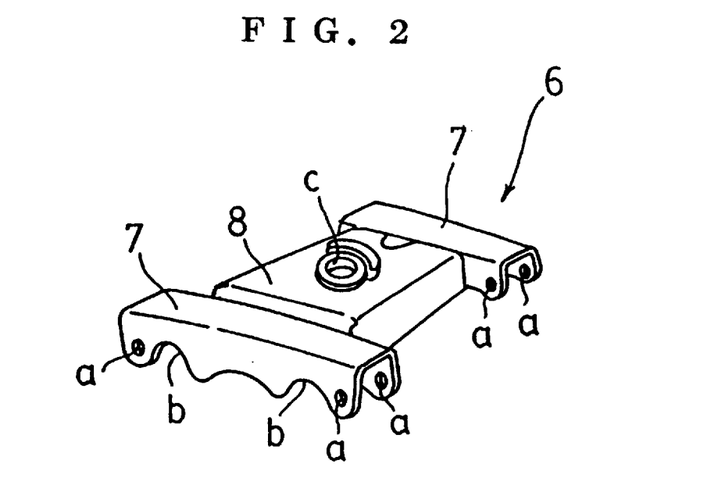
FIG. 2 is a perspective view of a lower component which comprises arm brackets and a steering bracket.

The frame structure 1 includes a lower component 6 fixed to front portions of the lower frames 2. As shown in FIG. 2, the lower component 6 comprises a pair of front and rear arm brackets 7 and a steering bracket 8 integrally joined to and disposed between the arm brackets 7. Before being joined to the lower frames 2, the arm brackets 7 and the steering bracket 8 are joined together into the lower component 6. Then, the lower component 6 is positioned and held in place by a setting jig (described later on), and joined to the lower frames 2.

Figure 3:
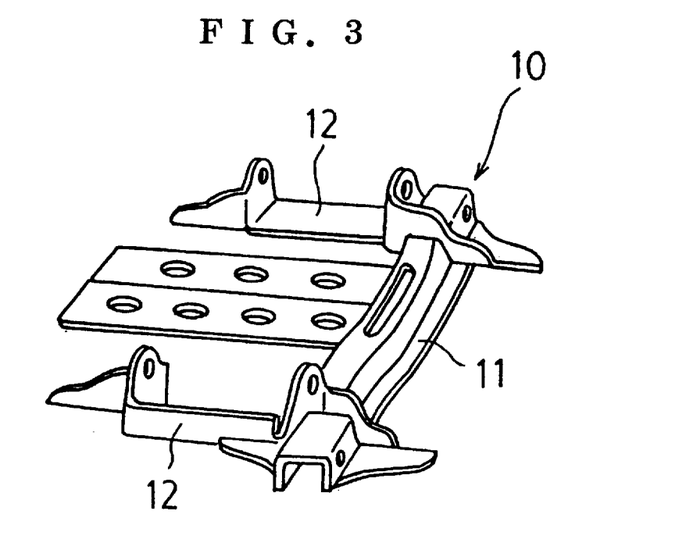
FIG. 3 is a perspective view of an engine/step component which comprises a step bracket and engine hangers.

An engine mount/step component 10 is fixed to rear portions of the lower frames 2 behind the lower component 6. As shown in FIG. 3, the engine mount/step component 10 comprises a step bracket 11 and a pair of laterally spaced engine mounts 12 connected to respective ends of the step bracket 11. After the step bracket 11 and the engine mounts 12 are joined together into the engine mount/step component 10, the component 10 is joined to the lower frames 2, as is the case with the lower component 6.

The arm brackets 7 of the lower component 6 serve to support a pair of laterally spaced swing arms (not shown). Each of the arm brackets 7 is of a channel shape which opens downwardly, and has attachment holes "a" defined in longitudinal ends thereof for receiving shafts (not shown) for attachment of the swing arms. One of the swing arms is pivotally supported by a shaft that is inserted in those attachment holes "a" which are positioned on one side of the lower component 6, and the other swing arm is pivotally supported by a shaft that is inserted in those attachment holes "a" which are positioned on the other side of the lower component 6. The swing arms thus pivotally supported on the lower component 6 support respective laterally spaced wheels (not shown) of the buggy.

The arm brackets 7 also have arcuate recesses "b" defined in lower edges thereof inwardly of the attachment holes "a". The arcuate recesses "b" are fitted over upper surfaces of the lower frames 2. Specifically, the arm brackets 7 are positioned on the lower frames 2 whose upper surfaces are fitted in the arcuate recesses "b".

The steering bracket 8 of the lower component 6 serves to support the lower end of a steering shaft (not shown), and has a through holder hole "c" defined centrally therein as a shaft holder hole.

The steering bracket 8 comprises a rectangular plate whose four sides are bent downwardly and hence it has a downwardly open box shape. The front and rear sides of the steering bracket 8 are joined to the arm brackets 7, respectively, and the lateral sides thereof are joined to respective inner surfaces of the lower frames 2.

The arm brackets 7 and the steering bracket 8 are integrally joined together into the lower component 6 by welding or the like. Thereafter, the lower component 6 is positioned on and joined to the lower frames 2 using a setting jig 16 (see FIG. 4) of a positioning table 15.

Figure 4:
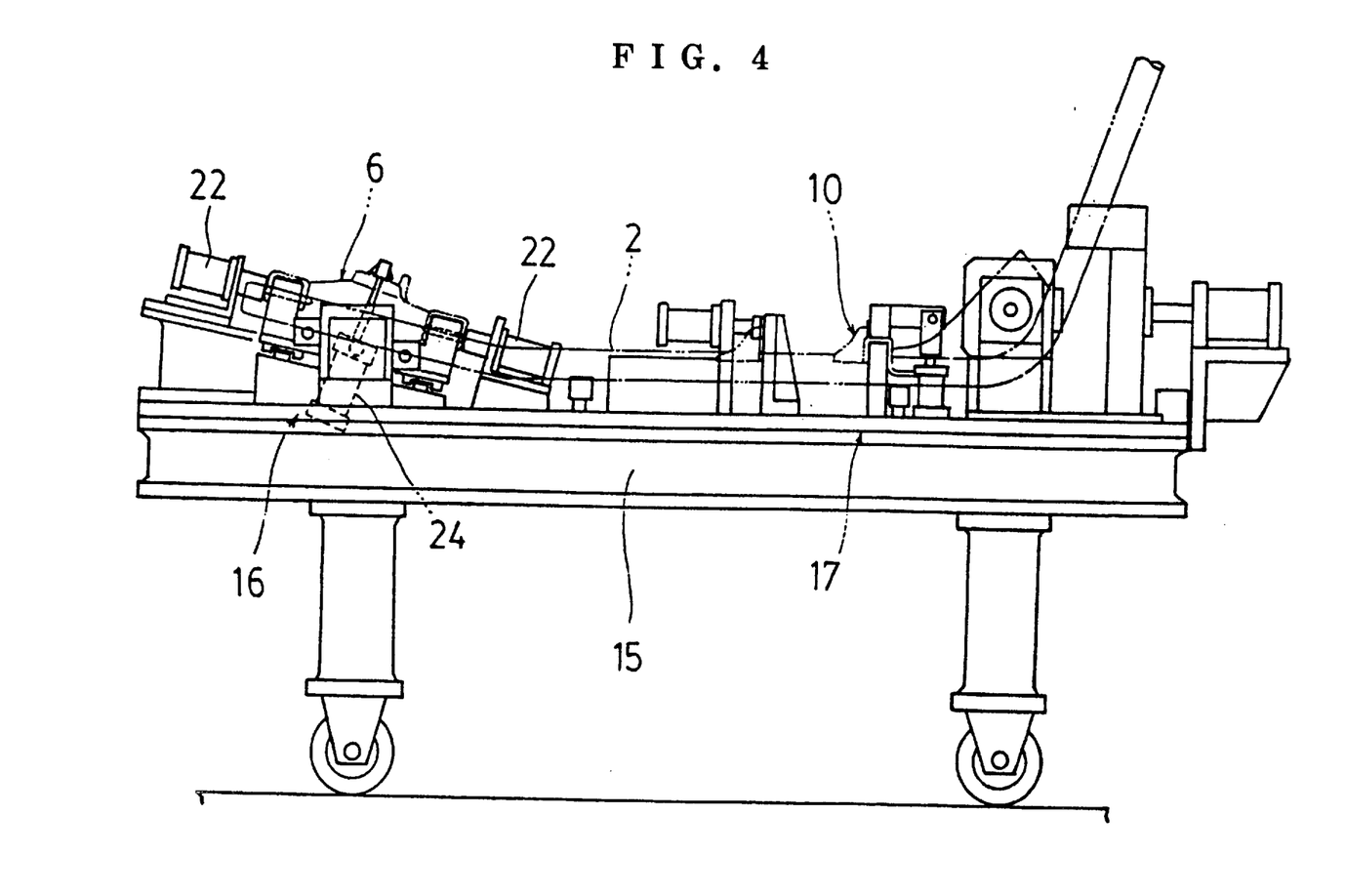
FIG. 4 is a side elevational view of a positioning table which is used when the lower component and the engine/step component are to be joined to lower frames.

The positioning table 15 has another setting table 17 for positioning the engine mount/step component 10 on the lower frames 2.

The lower frames 2 are positioned on the positioning table 15, and the assembled lower component 6 and the assembled engine mount/step component 10 are set and positioned on the lower frames 2 by the setting jigs 16, 17, respectively.

The setting jig 16 will be described below with reference to FIGS. 5 through 7.

Figure 6:
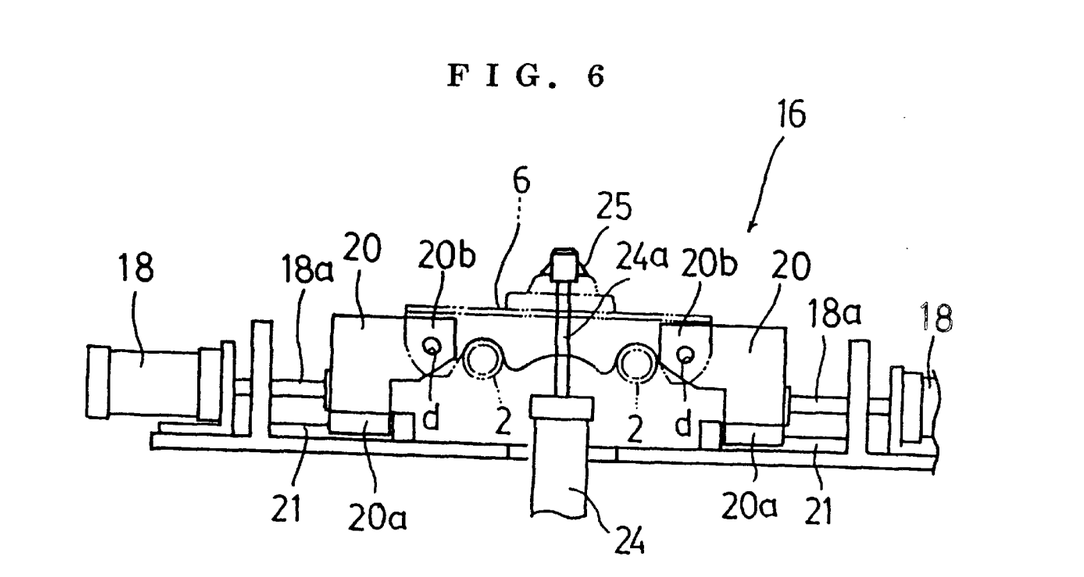
FIG. 6 is an enlarged front elevational view of the setting jig.
Figure 7:
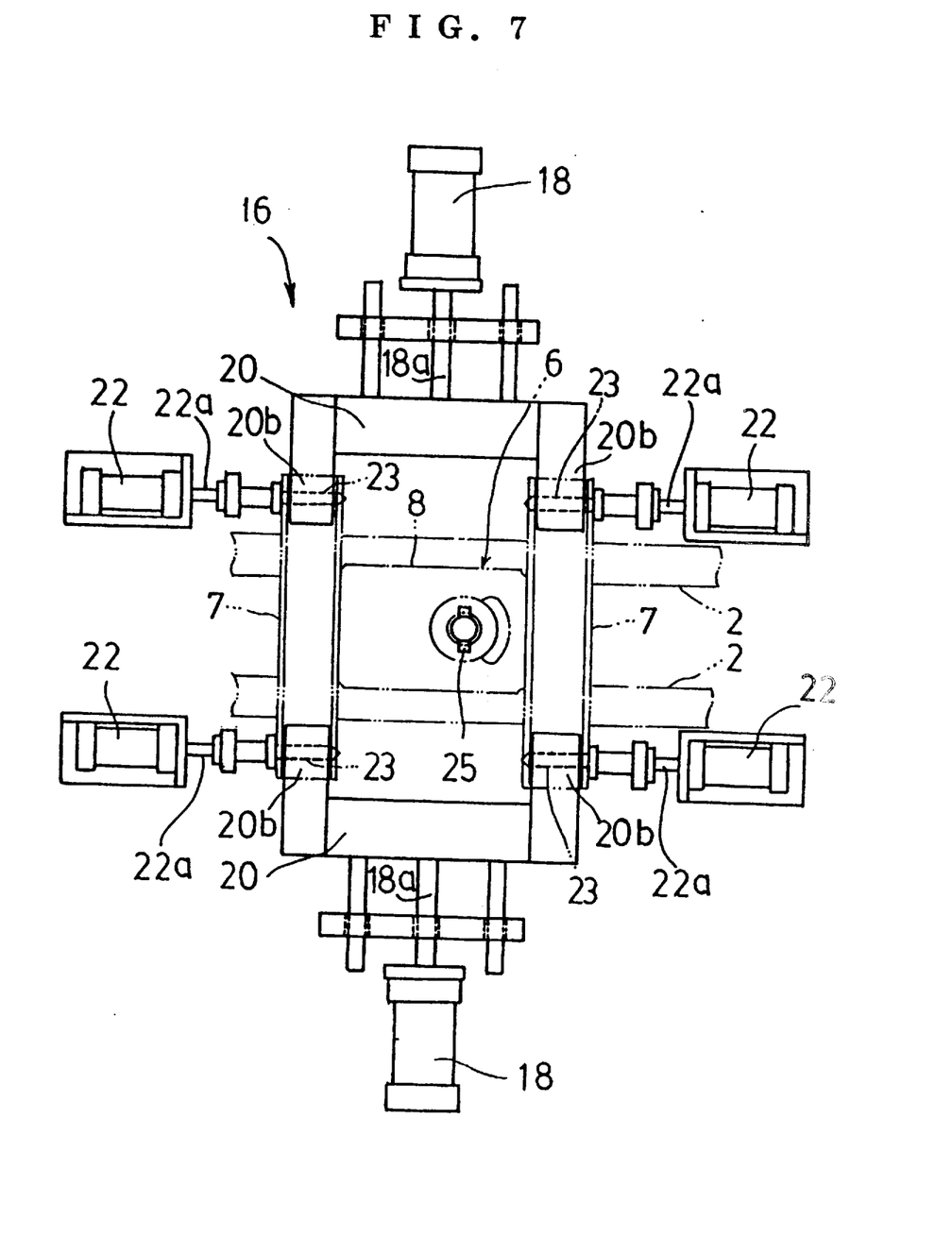
FIG. 7 is a plan view of the setting jig.

As shown in FIG. 7, the setting jig 16 comprises a pair of lateral cylinder units 18 disposed in confronting relation to each other, on opposite sides of the lower frames 2 which are positioned on the positioning table 15, two laterally spaced pairs of front and rear cylinder units 22 disposed closely to and outside of the lower frames 2, and a vertical cylinder unit 24 (see FIGS. 5 and 6) disposed substantially centrally in the setting jig 16. The lateral cylinder units 18 and the front and rear cylinder units 22 serve to position the lower component 6 transversely and longitudinally with respect to the lower frames 2. The vertical cylinder unit 24 serves to press the lower component 6 against the lower frames 2.

As shown in FIGS. 6 and 7, the lateral cylinder units 18 have respective piston rods 18a with position limiting members 20 mounted on their distal ends, respectively. The position limiting members 20 have respective slides 20a on lower ends thereof which are slidable along respective slide guides 21 that are mounted on the positioning table 15.

The position limiting members 20 have respective pairs of fitting blocks 20b on their upper portions which can be fitted into the channel-shaped ends of the front and rear arm brackets 7. When the piston rods 18a are extended, the fitting blocks 20b are fitted into the channel-shaped ends of the arm brackets 7. When the piston rods 18a are retracted, the fitting blocks 20b are withdrawn out of the channel-shaped ends of the arm brackets 7.

The fitting blocks 20b have respective positioning holes "d" which can be brought into registration with the attachment holes "a", respectively, of the arm brackets 7 when the fitting blocks 20b are fitted in the channel-shaped ends of the arm brackets 7.

Figure 5:
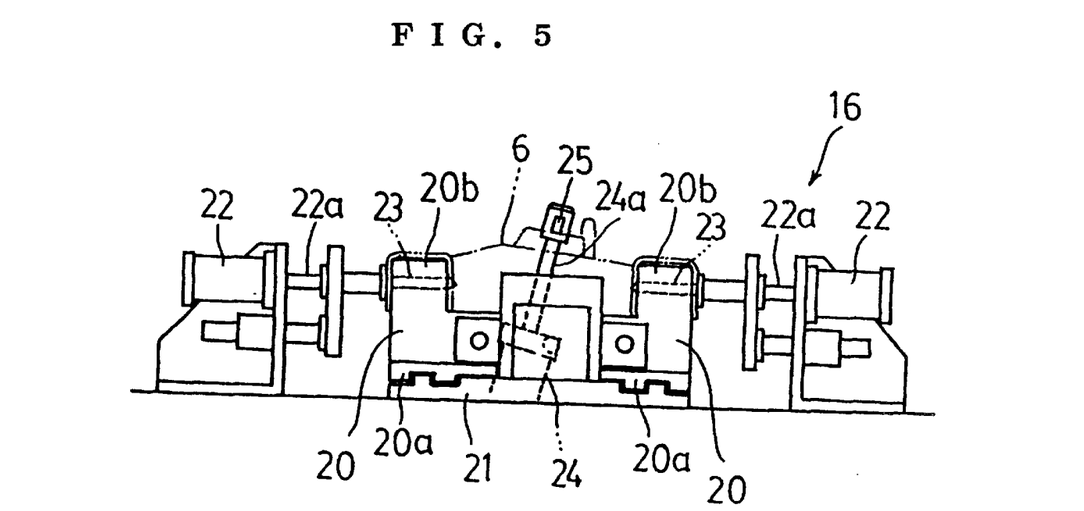
FIG. 5 is an enlarged side elevational view of a setting jig.

As shown in FIGS. 5 and 7, the front and rear cylinder units 22 have respective piston rods 22a with positioning pins 23 mounted in alignment on their distal ends. When the piston rods 22a are extended, the positioning pins 23 are inserted through the attachment holes "a" of the arm brackets 7 into the positioning holes "d" of the fitting blocks 20b. When the piston rods 22a are retracted, the positioning pins 23 are withdrawn out of the positioning holes "d" of the fitting blocks 20b.

The vertical cylinder unit 24 is fixedly mounted on the positioning table 15. The vertical cylinder unit 24 has a piston rod 24a whose distal end supports a pair of opposite projecting plungers 25. When external forces are applied to push the projecting plungers 25, the projecting plungers 25 are retracted into the distal end of the piston rod 24a. When no such external forces are applied, the projecting plungers 25 project outwardly in directions transverse to the piston rod 24a under biasing forces which act on the projecting plungers 25.

Figure 8A:
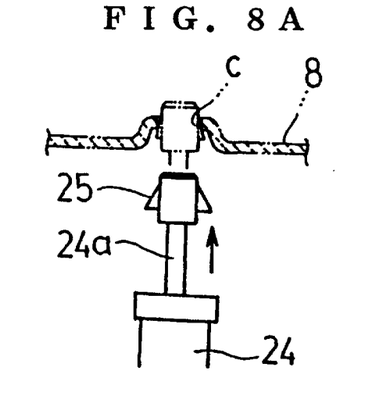
FIGS. 8A through 8C are fragmentary front elevational views showing the manner in which a vertical cylinder unit operates.
Figure 8B:
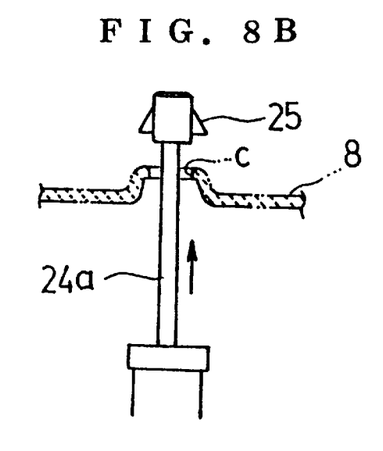
Figure 8C:
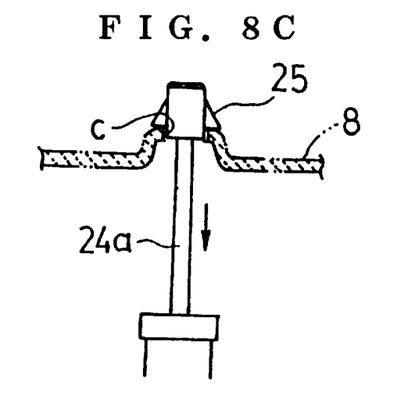

As shown in FIGS. 8A through 8C, each of the projecting plungers 25 is of a substantially triangular shape having a slanted side edge tapered off upwardly and a lower horizontal edge.

The vertical cylinder unit 24 is positioned such that when the piston rod 24a is extended, the distal end thereof can be inserted into the holder hole "c" of the steering bracket 8.

When the piston rod 24a is extended, the projecting plungers 25 are retracted into the distal end of the piston rod 24a as they pass through the holder hole "c", as shown in FIG. 8A. After the projecting plungers 25 have passed through the holder hole "c", the projecting plungers 25 project outwardly from the distal end of the piston rod 24a, as shown in FIG. 8B. When the piston rod 24a is subsequently retracted, the lower horizontal edges of the projecting plungers 25 engage the peripheral edge of the holder hole "c", pulling the steering bracket 8 downwardly toward the positioning table 15 thereby to press the lower component 6 against the lower frames 2.

The frame structure 1 is assembled as follows:

The arm brackets 7 and the steering bracket 8 are put together and welded into the lower component 6. At this time, the attachment holes "a" of the arm brackets 7 and the holder hole "c" of the steering bracket 8 are accurately positioned.

The step bracket 11 and the engine mounts 12 are also put together and welded into the engine mount/step component 10.

Thereafter, as shown in FIG. 4, the lower frames 2 are positioned in place on the positioning table 15. Then, the lower component 6 is set on the setting jig 16, and the engine mount/step component 10 is set on the setting jig 17.

When the lower component 6 is set on the setting jig 16, the arcuate recesses "b" of the arm brackets 7 are fitted over the upper surfaces of the lower frames 2.

The lateral cylinder units 18 are operated to move the position limiting members 20 toward each other. The fitting blocks 20b are inserted a given distance into the channel-shaped ends of the arm brackets 7, thereby positioning the lower component 6 in the longitudinal direction of the lower frames 2. The front and rear cylinder units 22 are also operated to insert the positioning pins 23 through the attachment holes "a" of the arm brackets 7 into the positioning holes "d" of the fitting blocks 20b, thereby positioning the attachment holes "a".

Thereafter, the vertical cylinder unit 24 is operated to extend the piston rod 24a until the projecting plungers 25 pass through the holder hole "c". Then, the piston rod 24a is retracted to cause the projecting plungers 25 to engage and pull the peripheral edge of the holder hole "c" downwardly toward the positioning table 15. Therefore, the edges of the arcuate recesses "b" of the arm brackets 7 are pressed against the lower frames 2, and the lateral sides of the steering bracket 8 are pressed against the lower frames 2.

With the arm brackets 7 and the steering bracket 8 being pressed against the lower frames 2, contacting regions of the lower component 6 and the lower frames 2 are welded to each other. Since the attachment holes "a" which need to be highly positionally accurate and the holder hole "c" have been positioned by the positioning pins 23 and the piston rod 24a, respectively, they are not thermally strained by the welding process. Consequently, the contacting regions of the lower component 6 and the lower frames 2 can be joined to each other with high accuracy.

A steering shaft and swing arms (not shown) will subsequently be attached highly accurately to the frame structure 1 thus assembled.

Inasmuch as the arm brackets 7 and the steering bracket 8 are integrally joined to the lower frames 2, the welded assembly is highly strong, and can widely distribute loads that are applied thereto.

Because the attachment holes "a" and the holder hole "c" remain highly positionally accurate when the lower component 6 and the lower frames 2 are welded to each other, any subsequent process of removing thermal strains from the attachment hole "a" and the holder hole "c" is not required. As a result, the frame structure 1 can be manufactured highly efficiently.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A jig for use in joining a lower component to a pair of laterally spaced lower frames, said lower component comprising a pair of front and rear arm brackets for supporting swing arms and a steering bracket for supporting a steering shaft, said front and rear arm brackets and said steering bracket being joined to each other, said jig comprising:

arm bracket positioning means for positioning attachment holes defined in said front and rear arm brackets in a swing arm attachment position; and steering bracket positioning means for positioning a holder hole defined in said steering bracket in a steering shaft support position while pressing the lower component against the lower frames.

2. A jig according to claim 1, wherein said arm bracket positioning means comprises a plurality of front, rear, and lateral cylinder units for horizontally gripping said lower component to position the lower component laterally, said front and rear cylinder units having respective piston rods, and a plurality of positioning pins mounted on respective distal ends of said piston rods for engaging in and positioning said attachment holes, and wherein said steering bracket positioning means comprises a vertical cylinder unit having a piston rod for being inserted in said holder hole and pressing the lower component against said lower frames thereby to vertically positioning said lower component.

* * * * *